(12) United States Patent
Sammann et al.

(10) Patent No.: US 7,503,533 B1
(45) Date of Patent: Mar. 17, 2009

(54) METHODS AND APPARATUS FOR JOINING FRAME MEMBERS OF A PLAYSET OR SIMILAR STRUCTURE

(75) Inventors: Charles C. Sammann, Amarillo, TX (US); Trace A. McGuire, Amarillo, TX (US); Jesse J. Valle, Amarillo, TX (US)

(73) Assignee: Backyard Leisure Holdings, Inc., Pittsburg, KS (US)

( * ) Notice: Subject to any disclaimer, the term of this patent is extended or adjusted under 35 U.S.C. 154(b) by 122 days.

(21) Appl. No.: 11/475,661

(22) Filed: Jun. 27, 2006

(51) Int. Cl.
*F16M 11/00* (2006.01)
(52) U.S. Cl. .................................. 248/200; 403/232.1
(58) Field of Classification Search ................ 248/200, 248/236, 238, 220.1, 220.21, 235; 403/403, 403/232.1, 234, 237; 472/118, 125; 482/35, 482/36
See application file for complete search history.

(56) References Cited

U.S. PATENT DOCUMENTS

| | | | | |
|---|---|---|---|---|
| 4,812,075 A * | 3/1989 | Lavin, Sr. ................... 403/403 |
| 5,016,873 A * | 5/1991 | Bossa ......................... 472/118 |
| 5,380,116 A * | 1/1995 | Colonias ................... 403/232.1 |
| 7,014,383 B2 * | 3/2006 | Schmid et al. .............. 403/231 |
| 2002/0112438 A1 * | 8/2002 | Little .......................... 52/702 |
| 2005/0163564 A1 * | 7/2005 | Tuell .......................... 403/403 |
| 2007/0201946 A1 * | 8/2007 | Sammann ................... 403/403 |

* cited by examiner

*Primary Examiner*—Ramon O Ramirez
(74) *Attorney, Agent, or Firm*—Hovey Williams LLP

(57) ABSTRACT

Apparatus and methods for a bracket useful with joints and bracing of structural members, especially for structures such as forts, swings, treehouses, playground equipment, decks, etc. that slips over the end of a brace board and bolts to that board on the face side of the board. The bracket preferably includes one or more molded holes spaced from a bracing member, to allow the bracket to be affixed to the structure to be braced. The bracket also preferably fits over or around a bracing structural member, and includes one or more transverse holes for fastening the bracket to the bracing structural member. Among other things, the bracket eliminates the need to fasten the members together via a screw or bolt positioned through the top edge of the bracing board or structural member. The bracket provides a stronger, more attractive, joint than the prior art, is preferably fabricated from plastic, and can be any desired color. Methods of fabrication and assembly are disclosed.

9 Claims, 7 Drawing Sheets

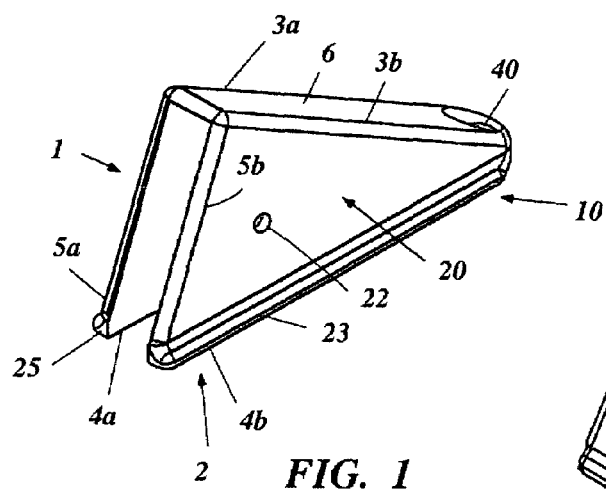
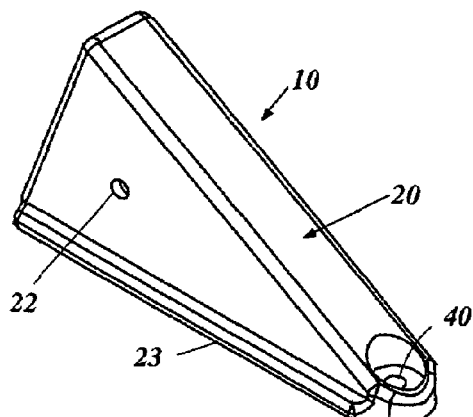
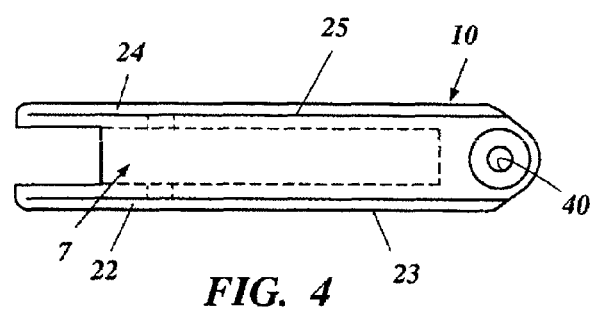
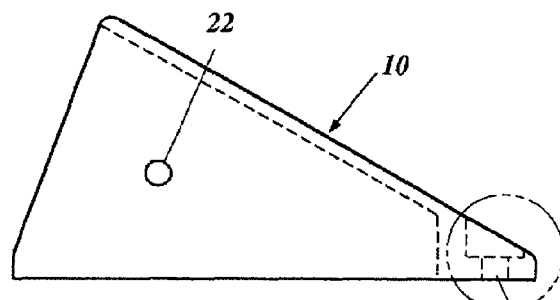
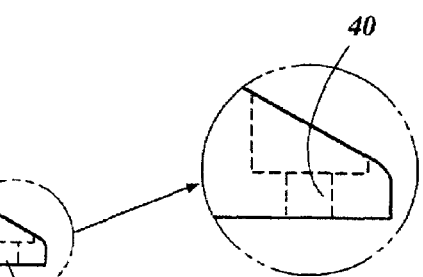
FIG. 1
FIG. 2
FIG. 4
FIG. 3
FIG. 5

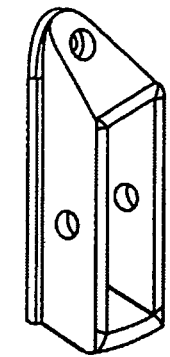
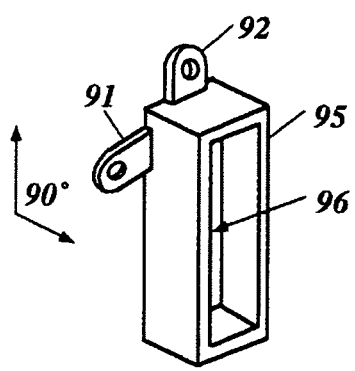
FIG. 9
FIG. 10
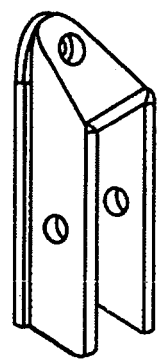
FIG. 11
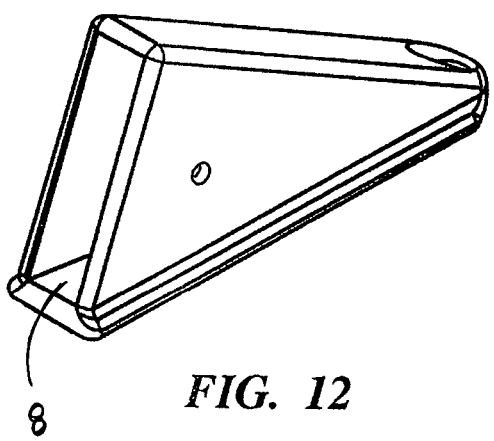
FIG. 12

METHODS AND APPARATUS FOR JOINING FRAME MEMBERS OF A PLAYSET OR SIMILAR STRUCTURE

FIELD OF INVENTION

The invention relates generally to joints for backyard playsets or similar structures, and specifically to apparatus and methods for bracing upright structural members. Although the invention is primarily illustrated in connection with angled braces for a wooden swingset or treehouse structure, it has a wide range of other applications and uses.

BACKGROUND OF THE INVENTION

Backyard playsets (such as swingsets, forts, decks, etc.) commonly include a structural frame, with other elements (such as slides, rock walls, canopies, monkey bars, ladders, poles, etc.) fastened to the frame. For safety and stability, the frame and those other elements need to be sufficiently joined and/or braced to withstand expected uses of the equipment, such as children swinging, jumping, climbing, sliding, etc.

Simple angle bracing has been used in prior art, but the joints can be difficult to form with much structural integrity or very long life, especially for wooden structural members and braces. Among other things, simply "toe-nailing" an angle-cut brace into a wooden post (via a screw, bolt, nail, etc.) can sometimes split the brace (the piece through which you toe-nail), because the nail/screw/bolt path typically is "with the grain" of the brace (rather than transverse to the grain of the bracing board). This is true even if a hole is pre-drilled into the brace to facilitate the toe-nailing. An example of such a prior art "toe-nail" approach is shown in FIG. 1A, and shows how a bolt 15 can be used to fix a bracing board 17 to another member 18, through a pre-drilled hole in the edge 16 of the brace 17. In any case, such a "toe-nail" configuration provides a failure point for the joint, and commonly is positioned upwardly and exposed to the elements, so that it weathers (from sun damage, rain, snow, etc.) which can lead to an early "failure" of the joint.

For aesthetic and strength purposes (and to avoid children getting splinters when using the equipment), conventional angled braces also need to have a fairly precise angled cut at the joint, without a lot of jagged edges or protruding wood shards.

Similar considerations exist even for right-angle joints, such as those commonly used when an elevated deck or floor is attached at a given height upon one or more supporting posts, or any joint in which the cut end of a board "butts" into an upright or other structural member. Such right-angle joints may also be toe-nailed and therefore may have problems such as those mentioned above.

Although bracing (horizontal or at any other angle) may alternatively be formed using a dado joint to avoid or reduce such problems, dado joints typically are more costly to manufacture and/or assemble. Among other thing, fabricating a dado typically requires one or more jigs and cutting operations (not required for a toe-nail joint), a dado joint requires that the structural members have sufficient cross-section to permit the joint to be cut into them, and all of the various components (structural and/or bracing members) must be assembled in a relatively specific arrangement to make the dado joint work properly.

OBJECTS AND ADVANTAGES OF THE INVENTION

It is therefore an object of the invention to provide improved apparatus and methods for joining and/or bracing frame members, such as the structural members of a backyard wooden playset, fort, treehouse, or the like. Preferably, a strong, lightweight sleeve bracket is provided to overlie the joint and permit a plurality of structural members to be joined to each other using fastening means associated with the bracket.

Another object of the invention is the provision of a bracket of the aforementioned character that is inexpensive to manufacture, easy to assemble, and aesthetically pleasing.

An additional object of the invention is the provision of a joint as described herein, which is relatively strong and relatively protected from weather damage.

A still further object of the invention is the provision of a joint and bracket of the aforementioned character, in which the bracket reduces the need for a precise angled cut at the joint, and reduces the need to remove jagged edges or protruding wood shards from the cut ends of the structural members. In many embodiments, the invention also allows slightly imperfect or "damaged" ends of structural members to be used without any compromise in safety or aesthetic, because the "damage" can be concealed under or within the bracket/sleeve. This can be especially important for expensive woods such as redwood or the like, and can reduce the environmental costs of having to discard such wood members if they are only aesthetically damaged.

Another object of the invention is the provision of improved methods for joining and/or bracing structural elements such as boards, posts, beams, bracing members, framing members, and the like. Many of the benefits of the invention can be realized not only for wooden structural elements and joints, but also for structural elements made from metal, plastic, composites, and other materials, and combinations of those materials.

Yet another object of the invention is the provision of improved methods for joining and/or bracing structural elements not only for a backyard or playground playset or climbing structures (including without limitation forts, swings, treehouses, playground equipment, decks, and the like), but also for other constructions such as housing or building framing. Especially for applications in which aesthetics (including color) and/or weathering of a joint may be issues, the invention can have a broad and beneficial range of uses. Plastic embodiments of the bracket of the invention can be provided in virtually any desired color, can even be formed to completely "enwrap" one or more of the structural members, and can have decorative or other identifying or useful information or designs formed or engraved into the plastic. Similarly, handholds or other useful elements can be formed integrally with, or attached to, the bracket of the invention.

Although a principal application for the bracing bracket of the invention is for conventional backyard playset braces (typically angled within a range of approximately 30 to 60 degrees up from horizontal), the invention can be used for virtually any joint angle between 0 and 180 degrees, including right angle (90 degree) joints. Likewise, although the description herein is principally directed to a joint between two boards or other structural members, other embodiments of the invention (not shown) can be used to join three or more boards or other structural members within a joint. One extreme example would be to use the invention as a "hub" in the center of a plurality of wooden "spokes", even it the spokes are not literally being used as spokes of a wheel but instead as structural or aesthetic framing elements.

Other objects and advantages of the invention will be apparent from the following specification and the accompanying drawings, which are for the purpose of illustration only.

BRIEF DESCRIPTION OF THE DRAWINGS

FIG. 1 is a perspective view of an embodiment of the bracket of the invention.

FIG. 2 is similar to FIG. 1, but shows a perspective view of the same bracket from a different angle.

FIG. 3 is a side elevation view of the bracket of FIG. 1.

FIG. 4 is a top view of the bracket of FIG. 1.

FIG. 5 is an enlarged detail view of the tip of the bracket of FIG. 3.

FIG. 9 is a perspective view of yet another of the many alternative embodiments of the invention, illustrating one of the many ways that the bracket can enwrap a beam or structural member, and illustrating some of the many alternative embodiments of attachment flanges that can be practiced with the invention.

FIG. 10 is an alternative embodiment of the bracket of FIG. 9.

FIG. 11 shows bracket 79 of FIG. 8.

FIG. 12 shows an alternative embodiment of brackets 77 and 78 of FIG. 8 having an enclosed bottom.

DETAILED DESCRIPTION

Persons of ordinary skill in the art will understand that the components discussed herein can be fabricated from any of a wide variety of materials and processes. Preferably, the components are lightweight but suitably strong to withstand the loads and forces that they may encounter during use. Among others, high/low pressure plastic injection molding, structural foam molding, or blow-molding can be readily utilized to form lightweight components or structures embodying the invention, both for the bracket or brackets and the structural members. Likewise, a wide range of mechanisms, processes, and apparatus can be used to join the various members to each other and into a desired configuration, including (by way of example and not by way of limitation) screws, bolts, glue, tape, and the like.

Figure 6:
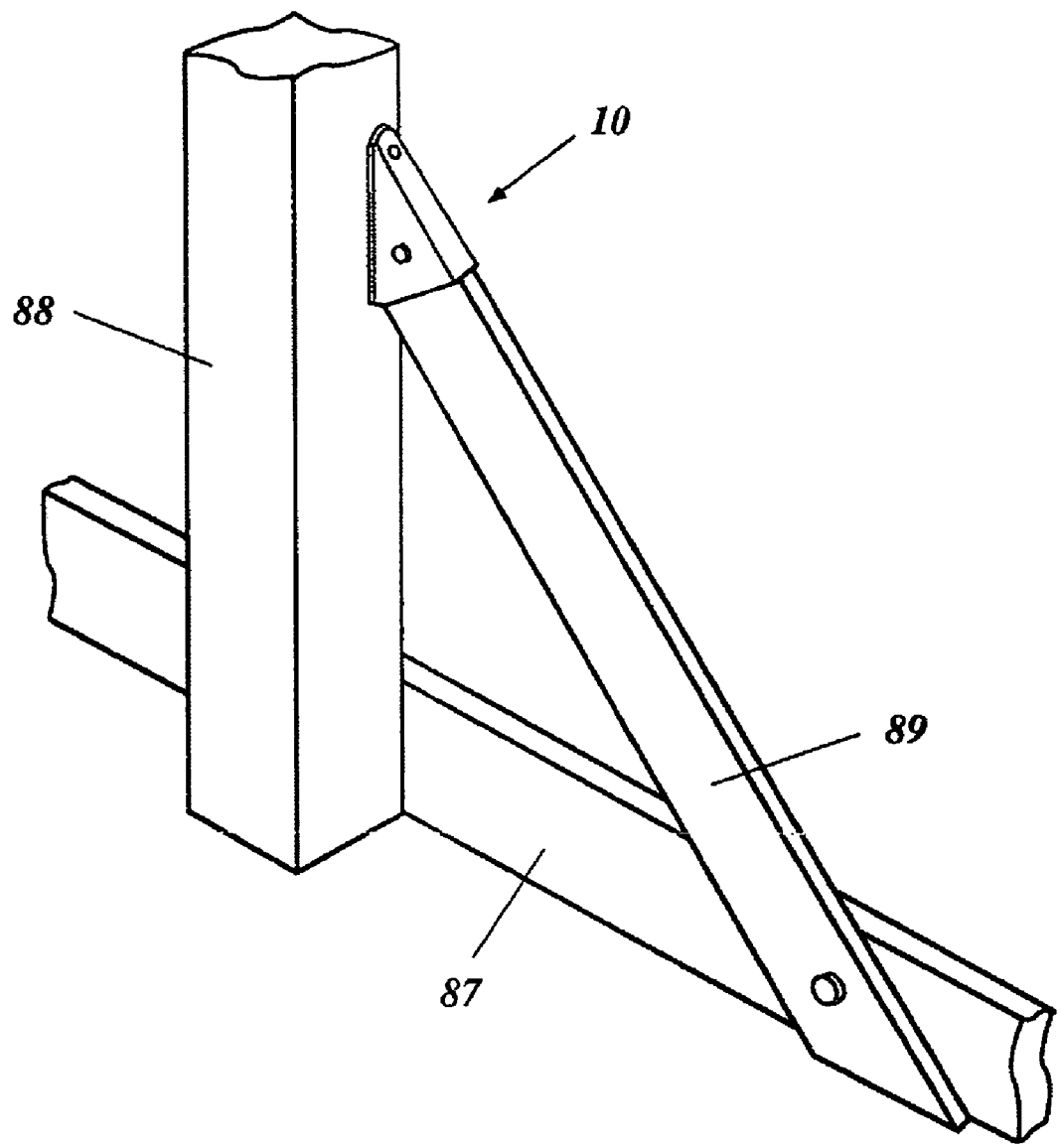
FIG. 6 is a perspective view of one of the many embodiments of a backyard playset of the invention.
Figure 7:
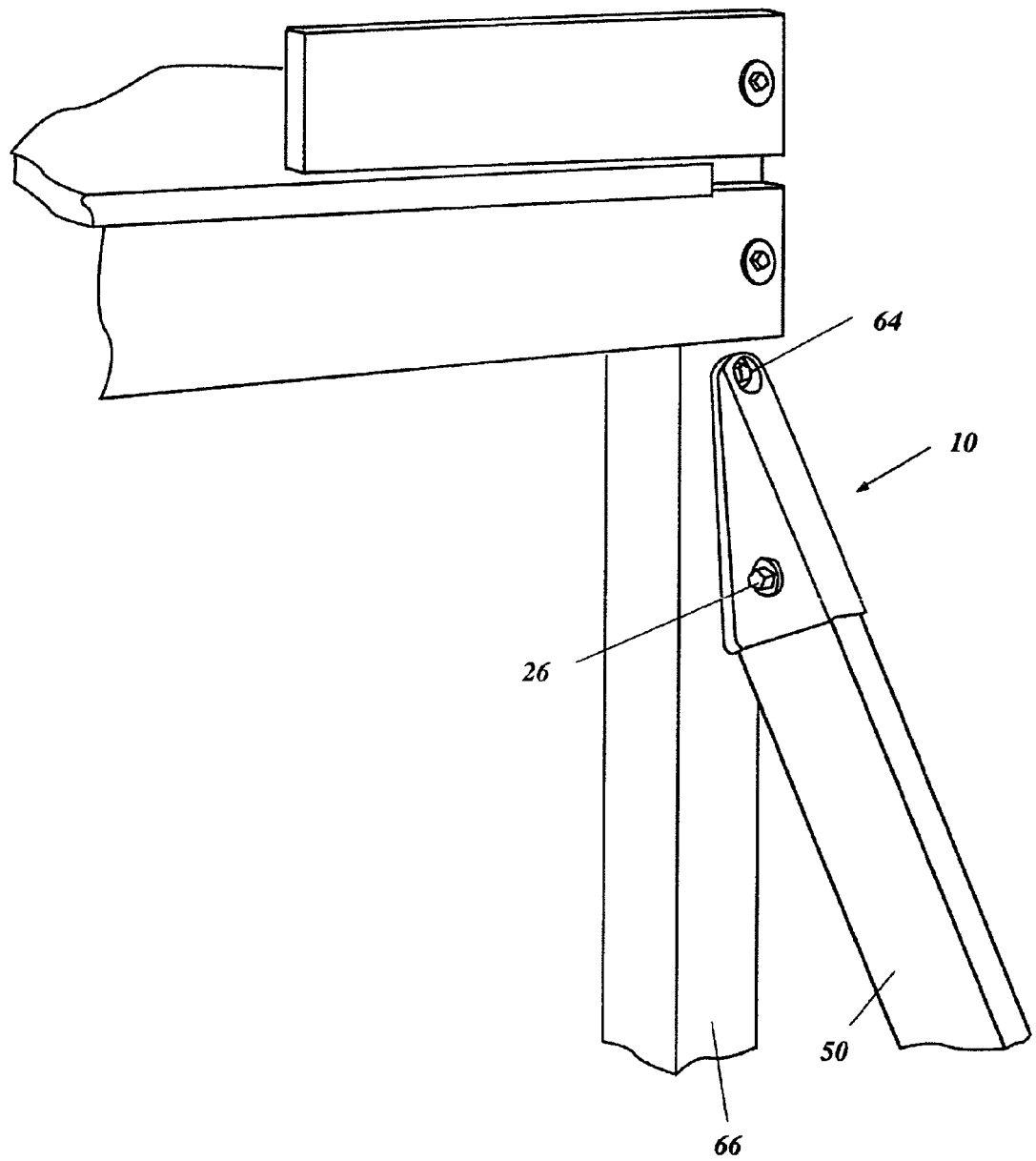
FIG. 7 is a close-up perspective view of one of the many embodiments of a backyard playset of the invention, similar to the top joint/brace element in FIG. 6.
Figure 8:
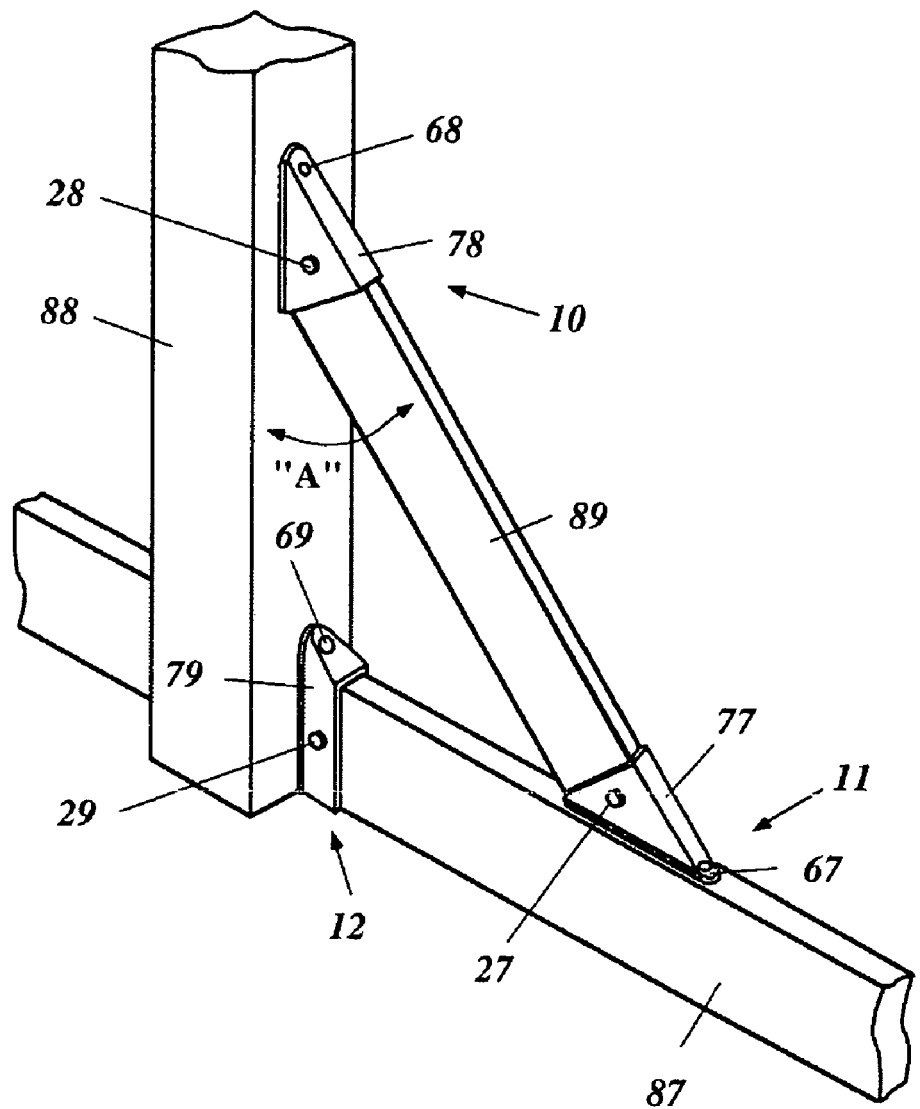
FIG. 8 is another of the many alternative embodiments of the invention, and illustrates the use of the invention at a bottom angled joint and at a right-angled joint.

In the embodiments shown in FIGS. 6-8, the structural elements may conveniently be made from wood or similar material, and the bracket element (see FIGS. 1-5) may be formed from plastic, via injection molding or any other suitable process.

An embodiment of the bracket of the invention is shown in some detail in FIGS. 1-5. The bracket 10 includes a body portion 20 with one or more attachment holes or orifices 22, 24, 40 to permit a bolt/screw/nut combination 27-29, 67, 68 to affix the bracket 10 to a brace or other structural member. In FIG. 7, the bracket 10 is fixed to a brace or first structural member 50 by a bolt/nut combination 26. In FIG. 8, similar bolt/nut combinations 27, 28, and 29 (or screws, etc.) can be used to affix the bracket 10 to a first beam or first structural member 89, a second beam or second structural member 88, and/or a third beam or third structural member 87 with the bolt or screw passing through the beam's grain in a transverse direction. As indicated elsewhere, alternative apparatus and methods of affixation include glue, welding, and the like.

The bracket 10 preferably includes a further attachment element such as a tab section (or recessed/countersunk or counterbore hole or orifice) 40. Preferably the further attachment element includes one or more recessed or countersunk holes to allow the shank of a bolt or screw (not shown in FIGS. 1-5) to pass through and engage another structural member, again going transverse to the grain for embodiments in which that other structural member is made from wood. Such countersunk holes provide a low bolt or screw profile that is less likely to snag clothes or other items. By way of example, a bolt 64 (FIG. 7) can be used to affix the bracket 10 to a structural member 66. In the example of FIG. 8, bolts/screws and/or nut combinations 67, 68, and/or 69 can be used to affix their respective brackets 77, 78, and 79 to the beams 87 and 88, respectively.

Figure 1A:
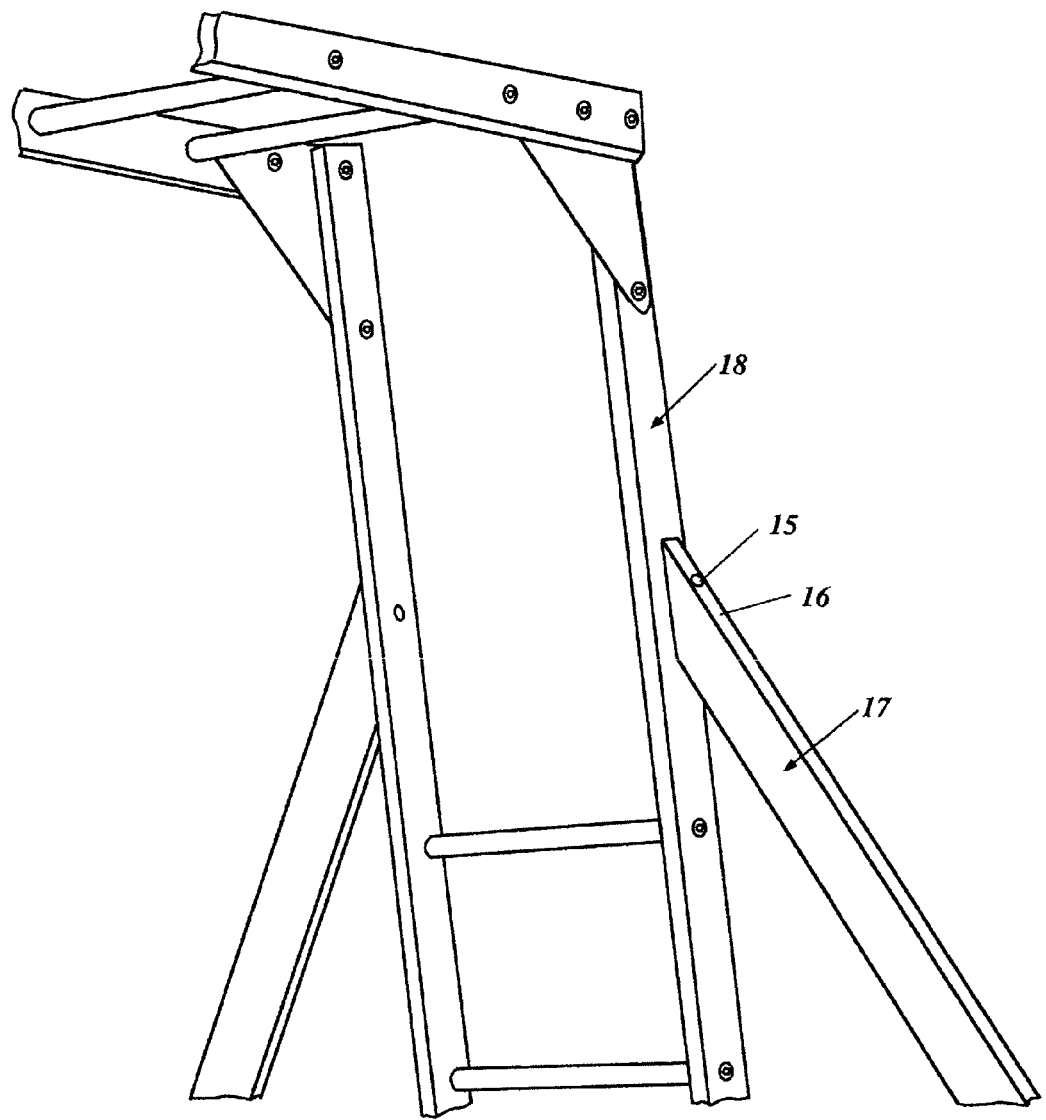
FIG. 1a is a perspective view of a prior art bracing joint on a backyard wooden playset.

In the embodiment shown in FIG. 1, the bracket 10 for joining structural members 87, 88, 89, includes a body portion 20 having a first triangular side 1 and a second triangular side 2. In this regard, preferably each triangular side 1, 2 is substantially the same size and shape and includes a top edge 3a, 3b, a bottom edge 4a, 4b opposite the top edge, and a base edge 5a, 5b connecting the top edge 3a, 3b to the bottom edge 4a, 4b. In one embodiment, as shown in FIG. 12, a bottom portion 8 joining together the bottom edge 4a, 4b of each side 1, 2, may be included.

The body portion 20 further includes a top section 6 joining the first side 1 and the second side 2 along the top edge 3a, 3b of each triangular side 1, 2 so that the first side 1 and the second side 2 are spaced apart and parallel to each other.

The spaced apart sides 1, 2 of the body portion 20 form a pocket 7 (shown in FIG. 4) for receiving a first structural member 89. In this regard, the pocket 7 is preferably of sufficient depth so that once received into the pocket 7 the first structural number 87 does not extend beyond the bottom edge 4a, 4b of each triangular side 1, 2. Preferably, the first side 1 and the second side 2 each include a corresponding orifice 22, 24 for receiving a first connection member 28 therethrough for joining together the body portion 20 and the first structural member 89, as shown in FIG. 8.

As further shown in FIG. 8, preferably, the bottom edge 4a, 4b of each triangular side 1, 2 is configured to contact a second structural member 88 substantially flush along the entire length of each bottom edge 4a, 4b. The top section 6 preferably includes an orifice 40 for receiving a second connection member 68 therethrough for joining together the body portion 20 and the second structural member 88. Accordingly, the triangular configuration of the body portion 20 permits a first structural member 89 and a second structural member 88 to be joined together at some angle other than zero degrees or parallel relative to each other as shown by angle "A" of FIG. 8.

As indicated in FIG. 9, a plurality of auxiliary attachment tabs/flanges 91, 92 can be provided, or single attachment points can be molded at any convenient position around the bracket. Although only two such tabs are shown in FIG. 9, persons of ordinary skill in the art will understand that more than two could be used, or any single one at any suitable position around the bracket 95.

Bracket 79 (FIGS. 8 and 11) is similar to the bracket of FIG. 9, but is shown as only covering the top and sides of the beam 87. In contrast, the bracket embodiment 95 in FIG. 9 completely enwraps the beam or structural member (not shown), and can even provide a snug fit for such a beam. Depending on the application, the receiving area 96 in the bracket 95 can be open (to allow the end of the beam to contact the other beam directly) or can be closed (such as with a wall of plastic formed integrally with the rest of the bracket 95). The latter may provide additional protection against undesirable weathering or other factors.

The bracket can be reinforced with wire or other fiber elements, to provide additional strength. Depending on the fabrication process, such reinforcing elements can be molded within the plastic or inserted into a hollow space (not shown) formed within the bracket.

For ease of manufacture, for added stability, or for other reasons, flange elements such as flanges 23, 25 can be formed in the bracket 10, around the area that will contact the beam secured via bolt hole 40. Other elements can be formed or engraved in the bracket as well, such as handholds, or other decorative or useful structures or information.

A structural/tie member, such as a diagonal board or beam 89 (extending to two braces 10 and 11 of an "upright" ladder element) or 87 (extending to only one brace 12) can be provided to increase the bracing benefit or other structural integrity of the assembly. Although the diagonal element can be joined to the other structural assembly by use of other brackets of the invention (see FIG. 8 for an example of three such brackets in use), it may be as convenient and less expensive to form those other joints by simply overlapping the boards and bolting transversely (across the grain) of both boards at that overlap point (as shown in FIG. 6).

Among the many alternatives for further increasing the bracing effect of the assembly is to drive stakes into the ground near the base of the braces and/or structural elements and connect the structural element or elements to such stake (s). Stakes or similar approach provide the added benefit of preventing the assembly from tipping over from wind or excessive use (such as swinging too high).

For embodiments of the bracket 10 that do not enwrap the bracing member (thus, unlike the embodiment of FIG. 9), the "open" side permits ready assembly of the joint. For example, brace 89 of FIG. 8 can be assembled (among other ways) by affixing the central ladder to the horizontal member 87, affixing the lower end of the brace 89 to one extremity of that horizontal member 87, and then positioning the upper end of the brace 89 against the upper area of the ladder. The bracket 10 can be placed over that upper joint. If necessary and desired, holes can be drilled or pre-drilled into the respective beams at the locations of the holes in the bracket, and in any case, screws or bolts (such as transverse bolt 26 and attachment bolt 64, FIG. 7) can be used to affix the bracket to the beams.

Figure 13:
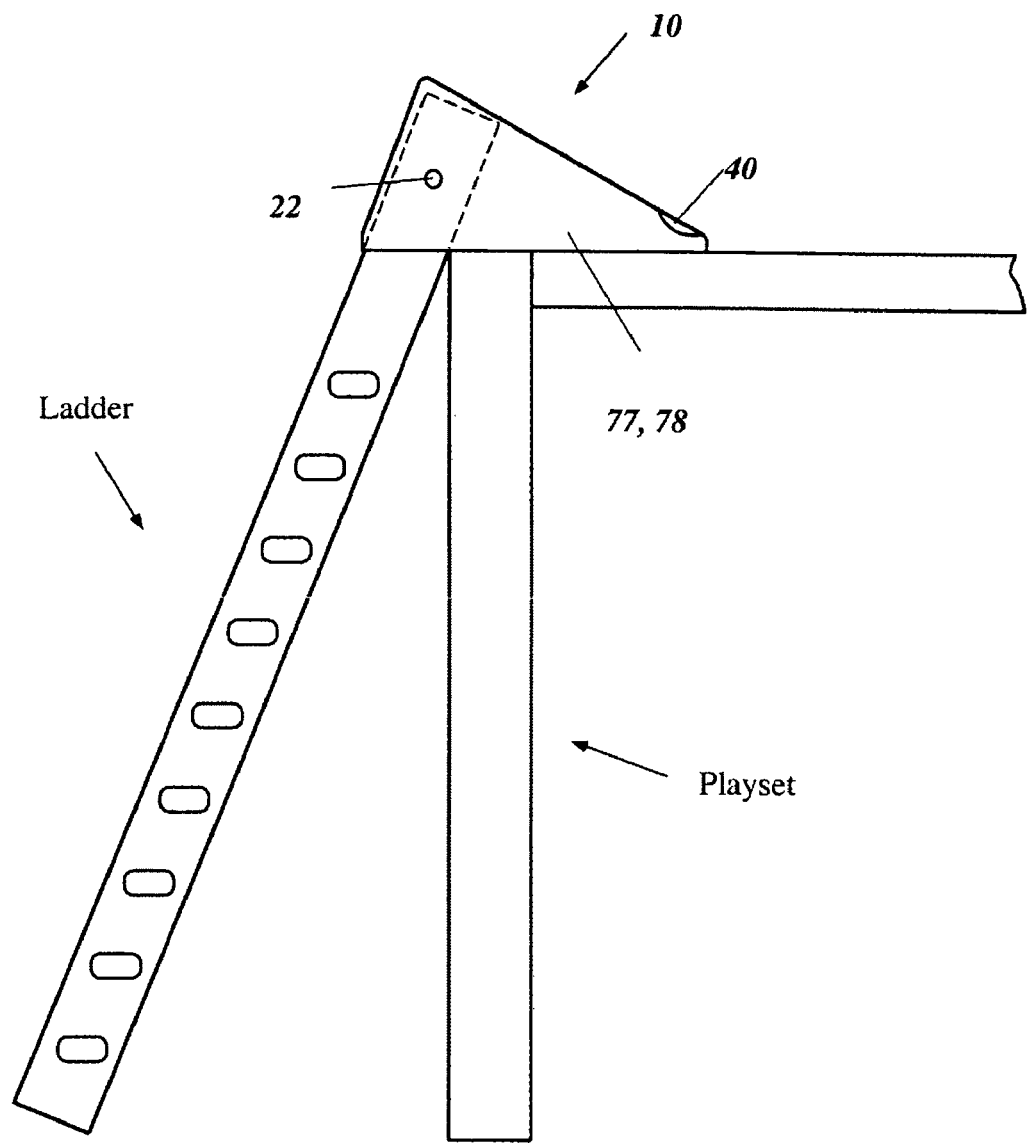
FIG. 13 shows brackets 77 and 78 being used to secure and incline object such as a ladder to a playset.

As shown in FIG. 13, brackets 77 and 78 of FIG. 8, may be used to secure an inclined object such as a ladder to a playset. Apertures 22 and 40 are preferably configured to receive an appropriate securing means, such as a bolt, screw, or similar device, to secure the ladder to the playset.

The apparatus and methods of the invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

What is claimed is:

1. A bracket for joining structural numbers, comprising:
   a body portion having a first triangular side and a second triangular side, each triangular side being substantially the same size and shape and including a top edge, a bottom edge opposite the top edge, and a base edge connecting the top to the bottom edge;
   a top section joining the first side and the second side along the top edge of each triangle so that the first side and the second side are spaced apart and parallel to each other;
   wherein the spaced apart sides form a pocket for receiving a first structural member, the pocket being of sufficient depth so that once received into the pocket the first structural member does not extend beyond the bottom edge of the triangle, the first side having an orifice and the second side having a corresponding orifice for receiving a first connection member therethrough for joining together the body portion and the first structural member, the bottom edge of each triangular side being configured to contact a second structural member substantially flush along the entire length of each bottom edge; and
   wherein the top section includes an orifice for receiving a second connection member therethrough for joining together the body portion and the second structural member, the body portion being configured to join the first structural member to the second structural member at an angle other than zero degrees relative to each other.

2. The bracket of claim 1, in which said bracket is fabricated from plastic.

3. The bracket of claim 1, in which said pocket is configured to completely surround said first structural member in a sleeve relationship.

4. The bracket of claim 1, in which said first and second structural members are made of wood.

5. A method of assembling a playset, including:
   providing a bracket of claim 1;
   aligning two or more structural members in operative relationship with the bracket; and
   fastening the bracket to each of the two or more wooden structural members.

6. A playset assembly, said assembly comprising:
   a first structural member;
   a second structural member, a portion of which is disposed adjacent said first structural member; and
   a bracket operably joining said first and second structural members,
   said bracket including a body portion having a first triangular side and a second triangular side, each triangular side being substantially the same size and shape and including a top edge, a bottom edge opposite the top edge, and a base edge connecting the top to the bottom edge,
   said body including a top section joining the first side and the second side along the top edge of each triangle so that the first side and the second side are spaced apart and parallel to each other,
   wherein the spaced apart sides of the body form a pocket that receives a portion of the first structural member, the pocket being of sufficient depth so that the first structural member does not extend beyond the bottom edge of the triangle once received into the pocket, the first side having an orifice and the second side having a corresponding orifice for receiving a first connection member therethrough to secure together the body portion and the first structural member, the bottom edge of each triangular side contacting the second structural member substantially flush along the entire length of each bottom edge, wherein the top section includes an orifice for receiving a second connection member therethrough to secure together the body portion and the second structural member, the body portion operably joining the first structural member to the second structural member at an angle other than zero degrees relative to each other.

7. The playset assembly of claim 6, in which said bracket is fabricated from plastic.

8. The playset assembly of claim 6, in which said first and second structural members are made of wood.

9. The playset assembly of claim 6, in which said pocket completely surrounds the portion of the first structural member in a sleeve relationship.

* * * * *